United States Patent
Etoh et al.

(10) Patent No.: US 8,400,896 B2
(45) Date of Patent: Mar. 19, 2013

(54) INFORMATION RECORDING AND REPRODUCING APPARATUS, PROGRAM FOR CONTROLLING SAME, COMPUTER-READABLE STORAGE MEDIUM, METHOD FOR CONTROLLING INFORMATION RECORDING AND REPRODUCING APPARATUS, AND INFORMATION STORAGE MEDIUM

(75) Inventors: Atsushi Etoh, Osaka (JP); Tetsuya Okumura, Osaka (JP); Hideharu Tajima, Osaka (JP); Shigemi Maeda, Osaka (JP); Yoshihisa Adachi, Osaka (JP); Tetsuya Hayashi, Osaka (JP); Yasuhiro Harada, Osaka (JP); Takashi Arimoto, Osaka (JP); Ikuo Nakano, Osaka (JP); Masaki Yamamoto, Osaka (JP); Hirohisa Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/138,519

(22) PCT Filed: Feb. 22, 2010

(86) PCT No.: PCT/JP2010/001152
§ 371 (c)(1),
(2), (4) Date: Aug. 26, 2011

(87) PCT Pub. No.: WO2010/098064
PCT Pub. Date: Sep. 2, 2010

(65) Prior Publication Data
US 2012/0002514 A1 Jan. 5, 2012

(30) Foreign Application Priority Data

Feb. 27, 2009 (JP) ................ 2009-047122

(51) Int. Cl.
*G11B 15/04* (2006.01)
(52) U.S. Cl. ........................ 369/53.2; 369/94
(58) Field of Classification Search .............. None
See application file for complete search history.

(56) References Cited

U.S. PATENT DOCUMENTS
(Continued)

FOREIGN PATENT DOCUMENTS
JP 2002/056543 A 2/2002
JP 2002/334448 A 11/2002
(Continued)

OTHER PUBLICATIONS

International Search Report dated Apr. 13, 2010 from PCT/JP2010/001152.

*Primary Examiner* — Paul Huber
(74) *Attorney, Agent, or Firm* — Edwards Wildman Palmer LLP; David G. Conlin; David A. Tucker

(57) ABSTRACT

An invention disclosed includes a layer number obtaining section (222) for determining which information storage layer (L1) has been accessed and a layer type identifying section (223) for identifying a type of the information storage layer (L1) determined by the layer number obtaining section (222). With the configuration, even in a case where an information recording and reproducing apparatus accesses an information storage layer different from an intended information storage layer by false operation or the like, it is still possible to dissolve mismatching between a recording or reproduction control scheme being set up and a recording or reproduction control scheme suitable for the information storage layer thus accessed.

12 Claims, 9 Drawing Sheets

U.S. PATENT DOCUMENTS

| | | |
|---|---|---|
| 7,151,729 B1 | 12/2006 | Park et al. |
| 2005/0099916 A1 | 5/2005 | Jeon et al. |
| 2005/0213467 A1 | 9/2005 | Noda et al. |
| 2006/0023622 A1* | 2/2006 | Suh .......................... 369/275.3 |
| 2007/0002699 A1* | 1/2007 | Suh .......................... 369/30.07 |
| 2007/0019533 A1 | 1/2007 | Ogawa et al. |
| 2007/0036044 A1 | 2/2007 | Park et al. |
| 2007/0036063 A1 | 2/2007 | Park et al. |
| 2007/0076548 A1 | 4/2007 | Maegawa |
| 2007/0121429 A1* | 5/2007 | Nakahara et al. .......... 369/30.04 |
| 2007/0253301 A1 | 11/2007 | Nakahara et al. |
| 2007/0253302 A1 | 11/2007 | Nakahara et al. |
| 2007/0263496 A1 | 11/2007 | Nakahara et al. |
| 2007/0263497 A1 | 11/2007 | Nakahara et al. |
| 2007/0263498 A1 | 11/2007 | Nakahara et al. |
| 2007/0263499 A1 | 11/2007 | Nakahara et al. |
| 2007/0263500 A1 | 11/2007 | Nakahara et al. |
| 2007/0274183 A1 | 11/2007 | Nakahara et al. |
| 2008/0002550 A1 | 1/2008 | Noda et al. |
| 2008/0025183 A1 | 1/2008 | Nakahara et al. |
| 2008/0043609 A1 | 2/2008 | Kato et al. |
| 2008/0056096 A1 | 3/2008 | Nakahara et al. |
| 2008/0056097 A1 | 3/2008 | Nakahara et al. |
| 2008/0056098 A1 | 3/2008 | Nakahara et al. |
| 2008/0068969 A1 | 3/2008 | Nakahara et al. |
| 2008/0117725 A1 | 5/2008 | Park et al. |
| 2008/0123490 A1 | 5/2008 | Ogawa et al. |
| 2008/0123491 A1 | 5/2008 | Park et al. |
| 2008/0123497 A1 | 5/2008 | Nakahara et al. |
| 2008/0130464 A1 | 6/2008 | Nakahara et al. |
| 2008/0273440 A1 | 11/2008 | Park et al. |
| 2009/0052310 A1* | 2/2009 | Kobayashi et al. ........ 369/275.3 |
| 2009/0103425 A1 | 4/2009 | Park et al. |
| 2010/0172231 A1 | 7/2010 | Fujii et al. |
| 2010/0177616 A1 | 7/2010 | Jeon et al. |

FOREIGN PATENT DOCUMENTS

| | | |
|---|---|---|
| JP | 2004/199757 A | 7/2004 |
| JP | 2005/032290 A | 2/2005 |
| JP | 2005/536823 A | 12/2005 |
| JP | 2006-236574 A | 9/2006 |
| JP | 2006/260610 A | 9/2006 |
| JP | 2007/026617 A | 2/2007 |
| JP | 2007/179666 A | 7/2007 |
| JP | 2007/250184 A | 9/2007 |
| JP | 2008/251147 A | 10/2008 |
| WO | WO2006/003978 A1 | 1/2006 |

* cited by examiner

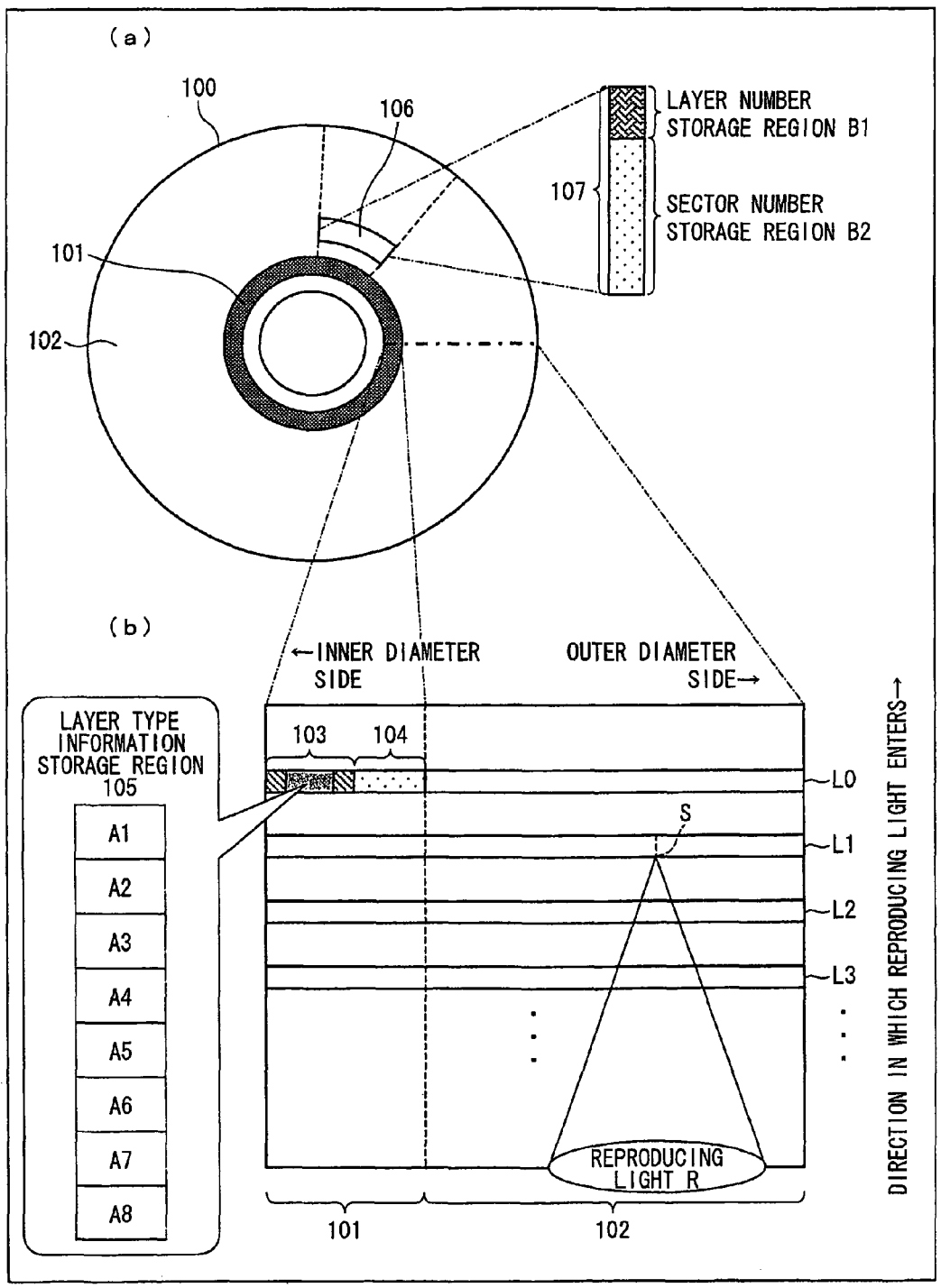

| A1 | A2 | A3 | A4 | A5 | A6 | A7 | A8 | . . . . |
|---|---|---|---|---|---|---|---|---|
| 10 | 01 | 01 | 01 | 00 | 00 | 00 | 00 | . . . . |

~105

(b)
T1

| STORAGE LAYER − STORAGE AREA ASSOCIATION TABLE ||||||||| 
|---|---|---|---|---|---|---|---|---|
| STORAGE AREA | A1 | A2 | A3 | A4 | A5 | A6 | A7 | A8 |
| STORAGE LAYER_EXAMPLE 1 | L0 | L1 | L2 | L3 | L4 | L5 | L6 | L7 |
| STORAGE LAYER_EXAMPLE 2 | L7 | L6 | L5 | L4 | L3 | L2 | L1 | L0 |
| STORAGE LAYER_EXAMPLE 3 | L3 | L0 | L4 | L2 | L1 | L7 | L5 | L6 |

(c)

LAYER NUMBER STORAGE REGION B1    SECTOR NUMBER STORAGE REGION B2

| | | |
|---|---|---|
| EXAMPLE 1 | · · 0 0 0 | · · · · · · · · · · · 0 0 1 0 0 0 | ~107
| EXAMPLE 2 | · · 0 0 1 | · · · · · · · · · · · 0 0 1 1 0 0 | ~107
| EXAMPLE 3 | · · 0 1 0 | · · · · · · · · · · · 0 0 1 1 1 0 | ~107
| EXAMPLE 4 | · · 0 1 1 | · · · · · · · · · · · 0 0 1 1 1 1 | ~107

(d)
T2

| LAYER NUMBER − STORAGE LAYER ASSOCIATION TABLE |||||||||
|---|---|---|---|---|---|---|---|---|
| LAYER NUMBER | 000 | 001 | 010 | 011 | 100 | 101 | 110 | 111 |
| STORAGE LAYER | L0 | L1 | L2 | L3 | L4 | L5 | L6 | L7 |

INFORMATION RECORDING AND REPRODUCING APPARATUS, PROGRAM FOR CONTROLLING SAME, COMPUTER-READABLE STORAGE MEDIUM, METHOD FOR CONTROLLING INFORMATION RECORDING AND REPRODUCING APPARATUS, AND INFORMATION STORAGE MEDIUM

This application is a 371 of PCT/JP2010/001152, filed Feb. 22, 2010.

TECHNICAL FIELD

The present invention relates to an information recording and reproducing apparatus that records and reproduces information in/from a multi-layered information storage medium having a plurality of information storage layers of different storage properties.

BACKGROUND ART

Recently, it has been demanded that an information storage medium has an improved storage capacity so as to allow processing of information of large quantity, such as an image or the like.

One way of improving the storage capacity of the information storage medium may be to multi-layer the information storage medium so as to have a plurality of information storage layers. For example, an information storage medium having up to two information storage layers are currently standardized and commercially available in form of DVD (Digital Versatile. Disc), BD (Blu-ray Disc; Registered Trademark), or the like.

An information storage medium having two or more information storage layers has a drawback described as follows. Some of the information storage layers are away from a side on which reproducing light enters the information storage medium. For reproduction of image from such information storage layer, the reproducing light having entered the information storage medium has to be transmitted through others of the information storage layer which are close to the side. In order for the reproducing light to be transmitted, however, reflectances of the information storage layers close to the side have to be small. Further, as the information storage medium is multi-layered to have the plurality of information storage layers, there is an adverse effect that light reflected from the information storage layer away from the side is decreased in intensity.

Due to such a problem, it is particularly difficult to provide a plurality of rewritable information storage layers in a single optical disc. Currently, not more than two (2) information storage layers can be provided in the single optical disc.

Meanwhile, an optical information storage medium described as follows has been recently demanded. Specifically, the demanded type of the optical information storage medium has an improved storage capacity by having a rewritable information storage layer and a read-only or recordable information storage layer in which various contents are recorded (hereinafter, the demanded type of the optical information storage medium is sometimes referred to as a "hybrid optical information storage medium").

The rewritable information storage layer, the read-only information storage layer, and the recordable information storage layer are hereinafter referred to as an RE (RE-writable) layer, an ROM (Read Only Memory) layer, and an R (Recordable) layer, respectively.

As one technique related to such multi-layered information storage medium, Patent Literature 1 discloses an optical disc and an optical disc apparatus disclosed.

The optical disc of Patent Literature 1 is a single optical disc having a plurality of information storage layers complying with respective different optical disc specifications. In the optical disc of Patent Literature 1, pieces of information indicative types of the respective plurality of information storage layers are stored in a management region of that of the plurality of information storage layers which has a storage density greater than the rest of the plurality of information storage layers.

The optical disc apparatus of Patent Literature 1 reads out the pieces of information by accessing this management region of the information storage section and holds them. Then, the optical disc apparatus of Patent Literature 1 determines which of the plurality of information storage layer to access. Based on the pieces of information indicative of the types of the respective plurality of information storage layers, the, optical disc apparatus of Patent Literature 1 sets a recording and reproduction scheme or the like (such as power setting) as suitable for the information storage layer to access.

Citation List

Patent Literature 1

Japanese Patent Application Publication, Tokukai, No. 2006-260610 A (Publication Date: Sep. 28, 2006)

SUMMARY OF INVENTION

Technical Problem

However, the disk and the apparatus of Patent Literature 1 have the following problem. In a case where an information storage layer different from a target information storage layer is accessed due to false operation of the optical apparatus or the like, it is impossible to identify a type of the information storage layer thus accessed. Consequently, there is a risk that mismatching occurs between the setting of the recording or reproduction control scheme etc. and a scheme etc. suitable for the information storage layer.

That is, the conventional information recording and reproducing apparatus has the following problem. Specifically, the convention information recording and reproducing apparatus employs a configuration that checks a position or a type of a target information storage layer prior to accessing the target information storage layer. For this reason, however, the conventional information recording and reproducing apparatus cannot check the position or the type of the target information storage layer after accessing the target information storage layer.

The present invention is made in view of the problem, and an object of the present invention is to provide an information recording and reproducing apparatus that, even in a case of accessing an information storage layer different from a target information storage layer due to false operation, can dissolve mismatching between (i) a recording or reproduction control scheme being set and (ii) such a scheme suitable for the information storage layer.

Solution to Problem

In order to attain the object, an information recording and reproducing apparatus of the present invention is an information recording and reproducing apparatus that records and reproduces information in/from an information storage medium having a plurality of information storage layers of two or more different types, the information recording and reproducing apparatus including: accessed layer determining means for determining an accessed information storage layer, which is an information storage layer that is accessed among the plurality of information storage layers; and accessed layer type identifying means for identifying a type of the accessed information storage layer thus determined by the accessed layer determining means.

In order to attain the object, a method of the present invention for controlling an information recording and reproducing apparatus that records and reproduces information in/from an information storage medium having a plurality of two or more types of information storage layers, the method including the steps of: determining an accessed information storage layer, which is an information storage layer that is accessed among the plurality of information storage layers; and identifying a type of the accessed information storage layer determined in the step of determining the accessed information storage layer.

According to the configuration, the accessed layer determining means determines the accessed information storage layer. According to the method, the accessed layer determining step determines the accessed information storage layer.

It is therefore possible to determine the accessed information storage layer.

Note that "access" herein means reproducing the information recorded in the information storage medium or recording the information in the information storage medium.

Note, also, that "having accessed" or "accessed" herein means having accessed the information storage layer, instead of being going to access the information storage layer.

According to the configuration, the accessed layer type identifying means identifies the type of the accessed information storage layer thus determined by the accessed layer determining means. According to the method, the accessed layer type identifying step identifies the type of the accessed information storage layer thus determined by the accessed layer determining step.

Thus, it is possible to identify the type of the accessed information storage layer. Note that examples of the "types of the information storage layers" can be (i) types of storage properties of rewritable information storage layers, read-only information storage layers, recordable information storage layers, and the like and (ii) types of specifications such as DVD, BD, and the like.

The information recording and reproducing apparatus thus configured can identify the type of the accessed information storage layer, even in a case where it has accessed an information storage layer different from an intended one due to false operation or the like. Thus, by appropriately setting a recording or reproduction control scheme, based on the type of the information storage layer thus identified, it is possible to dissolve mismatching between the setting of the recording or reproduction condition and a scheme suitable for the accessed information storage layer.

In order to attain the object, an information storage medium of the present invention is an information storage medium having a plurality of information storage layers of two or more different types, wherein each information storage layer stores therein layer number information discriminating the information storage layer from the rest of the plurality of information storage layers, and (ii) one or more of the information storage layers each store, in a management information region thereof, layer type information indicating types of the respective plurality of information storage layers.

According to the configuration, it is possible to provide the information storage medium in which the layer number information can be obtained from an accessed information storage layer and the layer type information can be obtained from the management information region of at least one of the information storage layers.

Even in a case where an information, storage layer different from an intended information storage layer is accessed, it is thus possible to dissolve mismatching between the setting of a recording or reproduction control scheme and a scheme suitable for the accessed information storage layer.

Advantageous Effects of Invention

That is, the information recording and reproducing apparatus of the present invention thus includes: the accessed layer determining means for determining an accessed information storage layer, which is an information storage layer that is accessed among the plurality of information storage layers; and the accessed layer type identifying means for identifying a type of the accessed information storage layer thus determined by the accessed layer determining means.

The method of the present invention for controlling the information recording and reproducing apparatus thus includes the steps of: determining an accessed information storage layer, which is an information storage layer that is accessed among the plurality of information storage layers; and identifying a type of the accessed information storage layer determined in the step of determining the accessed information storage layer.

The information storage medium of the present invention is thus configured so that each information storage layer stores therein layer number information discriminating the information storage layer from the rest of the plurality of information storage layers, and one or more of the information storage layers each store, in a management information region thereof, layer type information indicating types of the respective plurality of information storage layers.

Thus, even in a case of where an information storage layer different from an intended information storage layer is accessed due to false operation or the like by the information recording and reproducing apparatus, it is still possible to dissolve the mismatching between the recording or reproduction control scheme thus being set and a scheme suitable for the accessed information storage layer.

For a fuller understanding of the nature and advantages of the invention, reference should be made to the ensuing detailed description taken in conjunction with the accompanying drawings.

BRIEF DESCRIPTION OF DRAWINGS

FIG. 1 is a block view showing a configuration of a main section of an information recording and reproducing apparatus according to one embodiment of the present invention.

FIG. 2 is a block view schematically showing a configuration of the entire information recording and reproducing apparatus.

FIG. 3

(a) and (b) of FIG. 3 are views schematically showing a configuration of an information storage medium according to one embodiment of the present invention. (a) of FIG. 3 shows the information storage medium from a side on which reproducing light enters the information storage medium. (b) of FIG. 3 shows a partial cross section of the information storage medium.

FIG. 4

(a) through (d) of FIG. 4 are views showing examples of information used by the information recording and reproducing apparatus and the information storage medium. (a) of FIG. 4 shows one example of layer type information. (b) of FIG. 4 shows one example of a storage layer—storage area association table. (c) of FIG. 4 shows four examples of address information storage region. (d) of FIG. 4 shows one example of a layer number—storage layer association table.

FIG. 5

Figure 5:
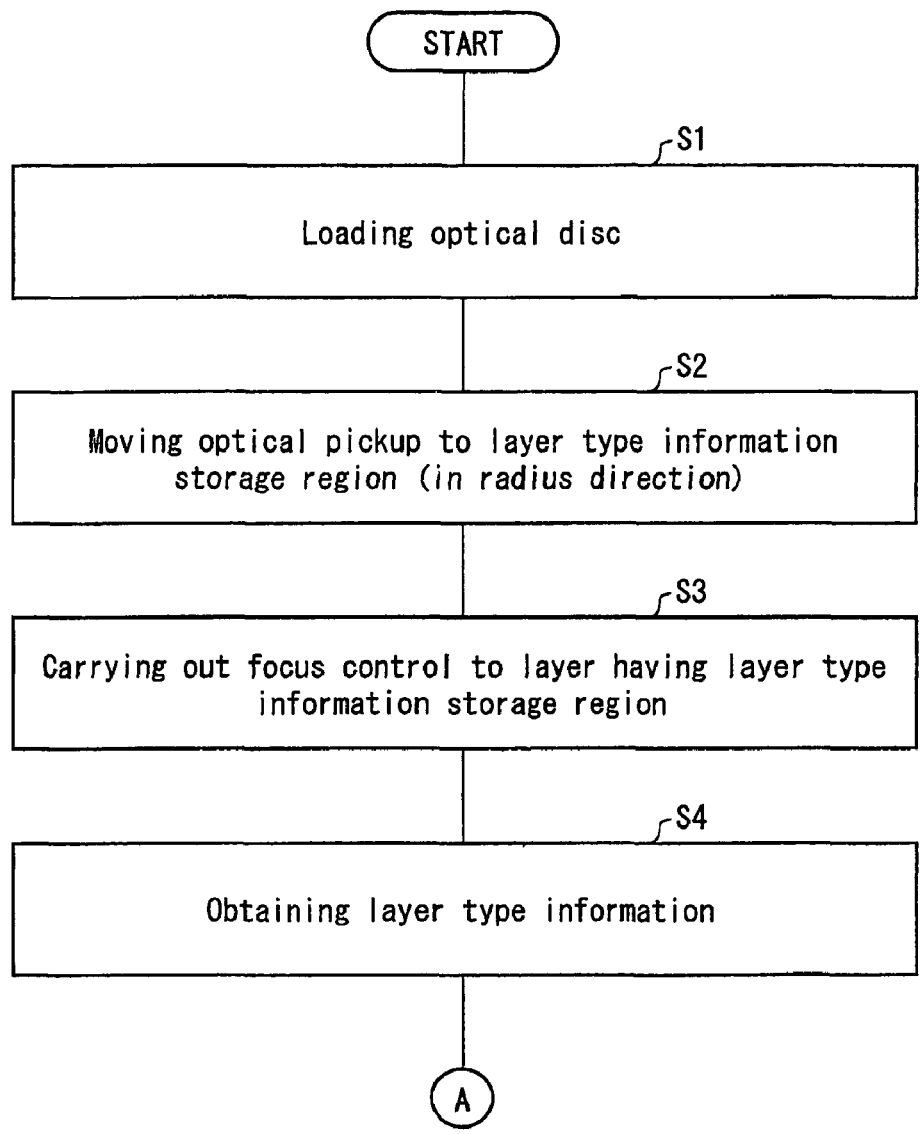

FIG. 5 is a flow chart showing a flow of an operation (a layer type information obtaining step) carried out by the information recording and reproducing apparatus.

FIG. 6

Figure 6:
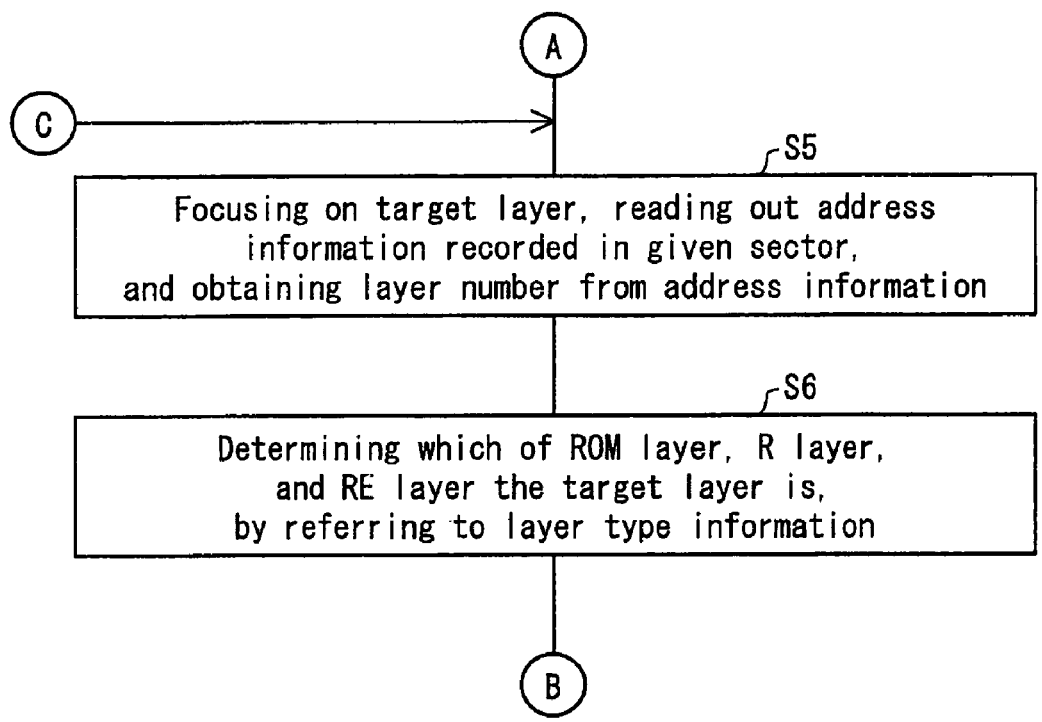

FIG. 6 is a flow chart showing a flow of an operation (a layer number obtaining step) carried out by the information recording and reproducing apparatus.

FIG. 7

Figure 7:
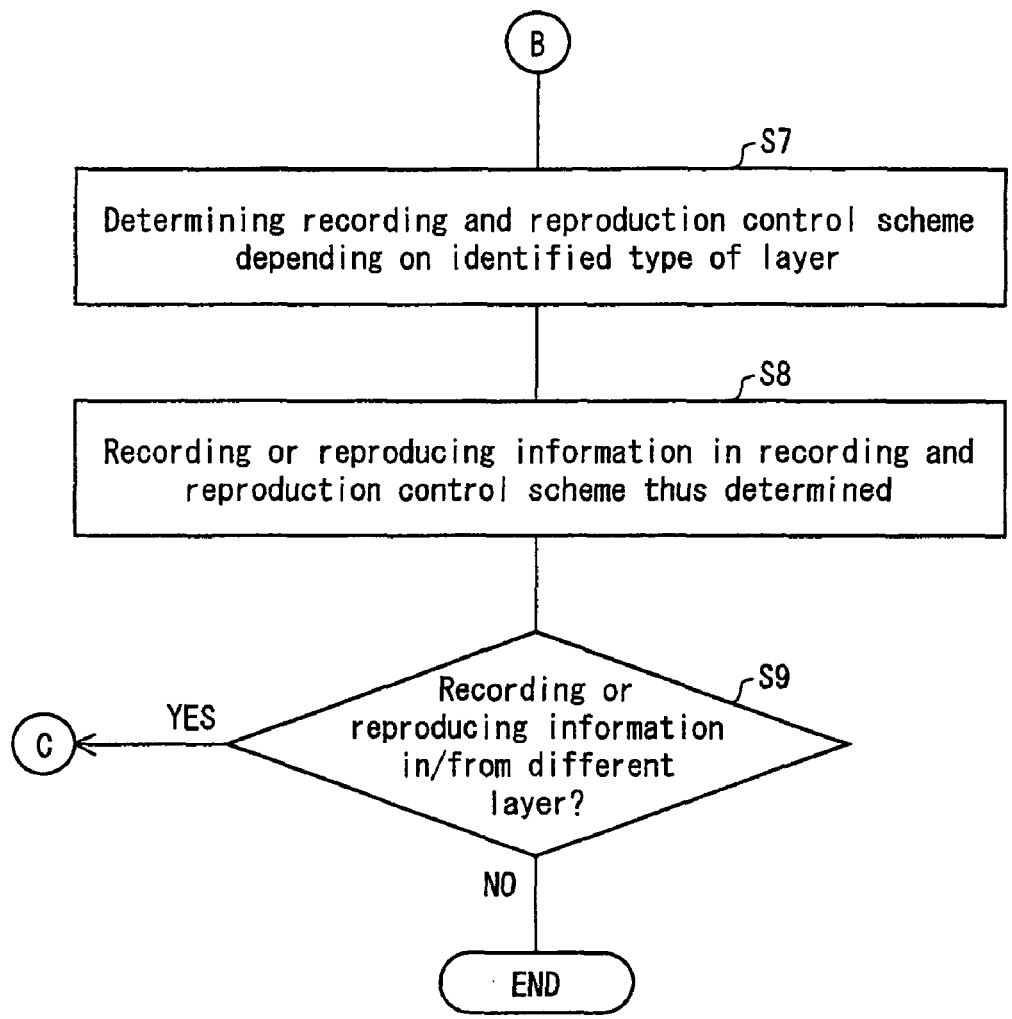

FIG. 7 is a flow chart showing a flow of an operation (a recording/reproduction condition setting step) carried out by the information recording and reproducing apparatus.

FIG. 8

Figure 8:
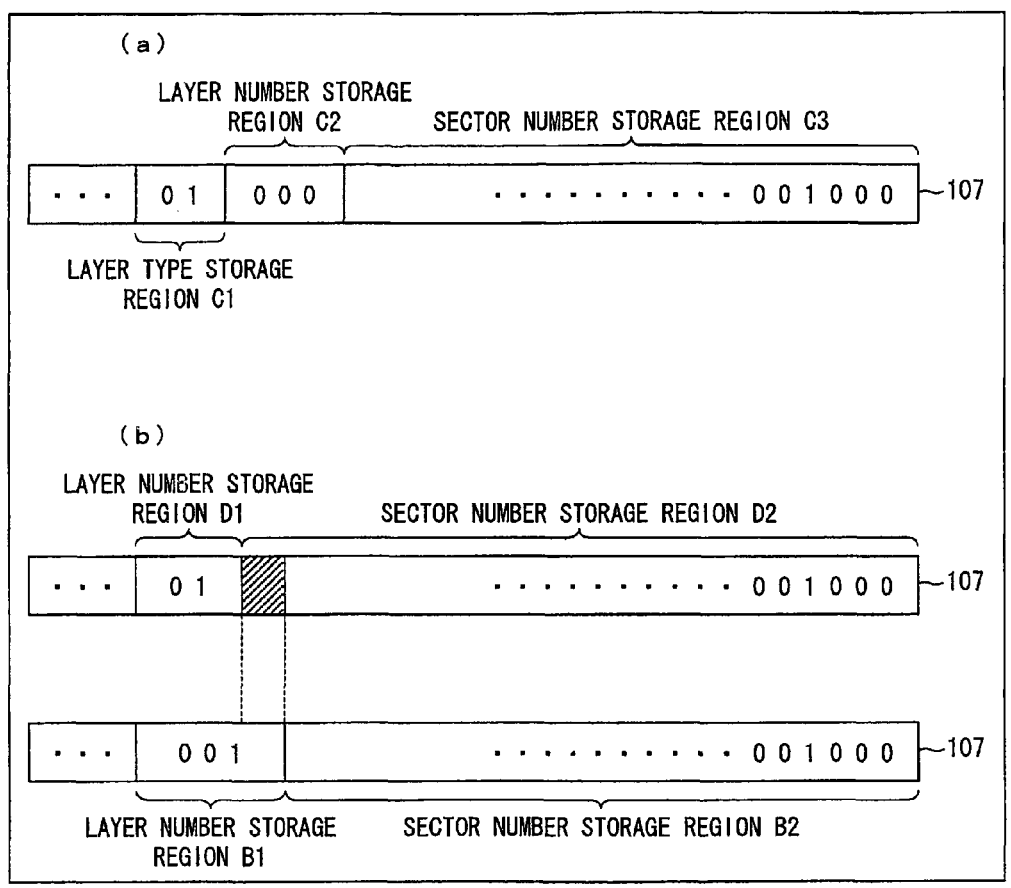

(a) and (b) of FIG. 8 are views showing examples of use embodiments of the address information storage region. (a) of FIG. 8 shows one example of the use embodiment of the address information storage region. (b) of FIG. 8 shows another example of the use embodiment of the address information storage region.

FIG. 9

Figure 9:
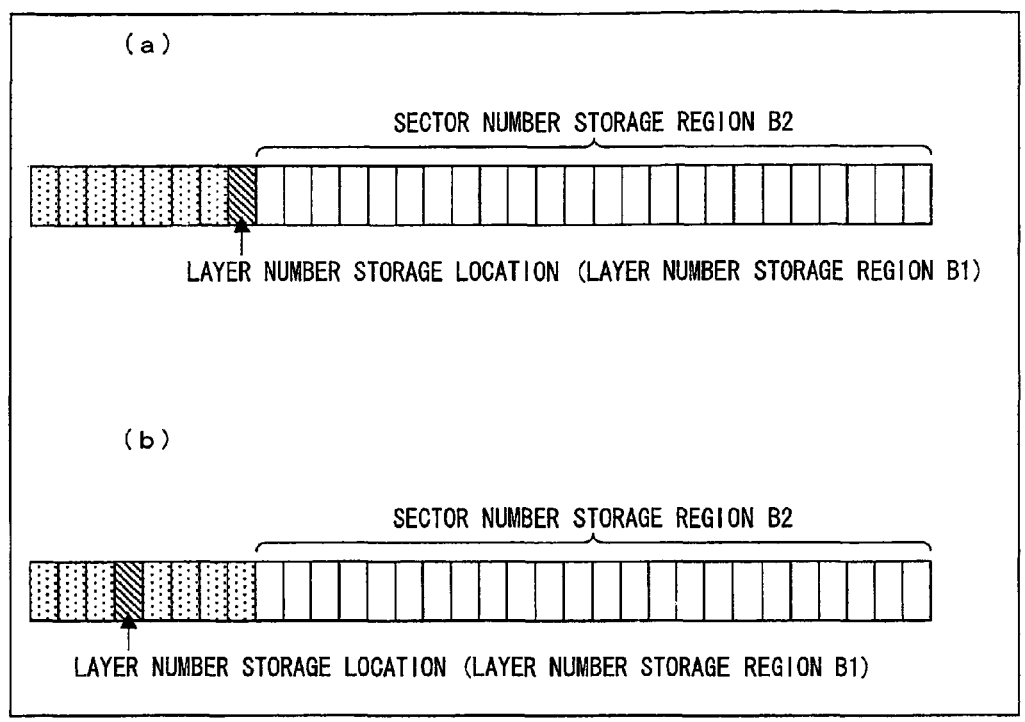

(a) and (b) of FIG. 9 are views showing examples of the use embodiments of the address information storage region. (a) of FIG. 9 shows still another example of the use embodiment of the address information storage region. (b) of FIG. 9 shows yet another example of the use embodiment of the address information storage region.

DESCRIPTION OF EMBODIMENTS

One embodiment of the present invention is described below with reference to the figures. For easy explanation, members having like functions as members shown in the figures are given like reference numerals, and their explanation is not repeated.

[1. Configuration of Information Recording and Reproducing Apparatus]

Figure 1:
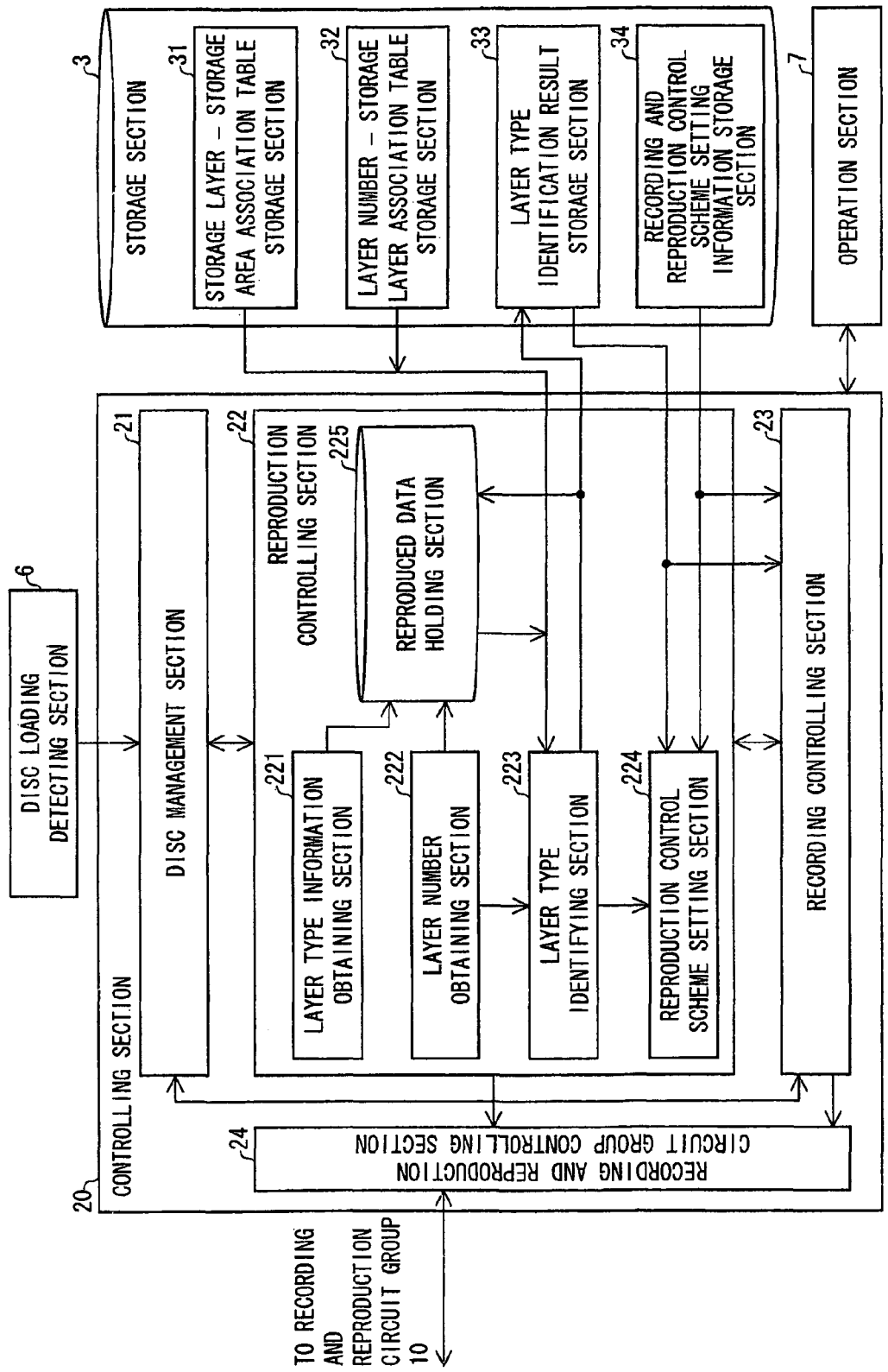
FIG. 1
Figure 2:
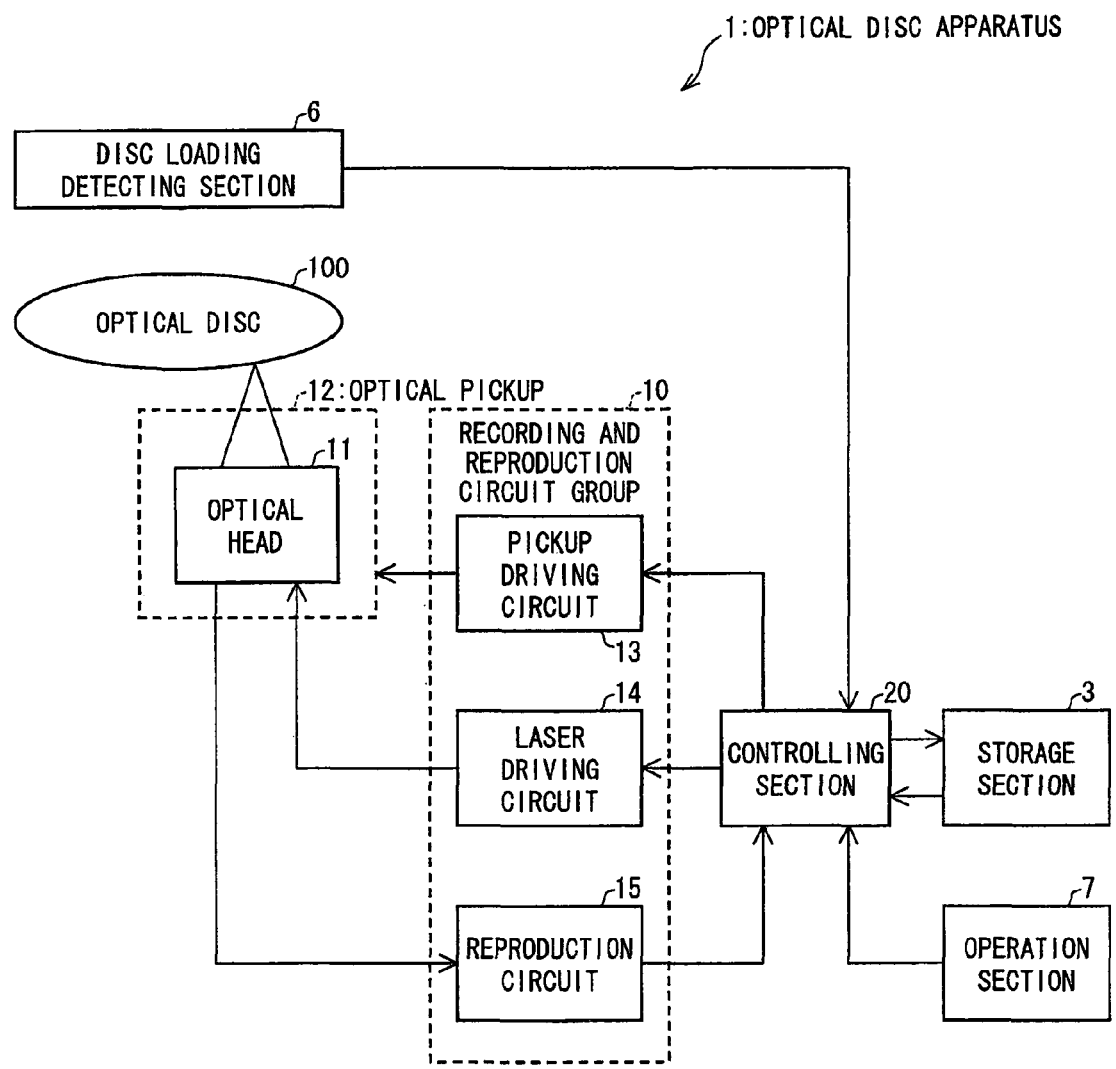
FIG. 2

With reference to FIGS. 1 and 2, the following discusses a configuration of an optical disc apparatus (information recording and reproducing apparatus) 1 according to one embodiment of the present invention.

FIG. 1 is a block view showing a configuration of a main section of the optical disc apparatus 1 according to the embodiment of the present invention. FIG. 2 is a block view schematically showing a configuration of the entire optical disc apparatus 1.

With reference to FIG. 2, the following outlines the configuration of the optical disc apparatus 1.

As shown in FIG. 2, the optical disc apparatus 1 mainly includes a storage section 3, a disc loading detecting section 6, an operation section 7, a recording and reproduction circuit group 10, an optical pickup 12 (which includes an optical head 11), and a controlling section 20.

The recording and reproduction circuit group 10 mainly includes a pickup driving circuit 13, a laser driving circuit 14, and a reproduction circuit 15.

The optical disc apparatus 1 is an apparatus that records and reproduces information in/from an optical disc (information storage medium) 100. The optical disc 100 is an optical information storage medium (information storage medium) such as DVD, BD, or the like.

As shown in FIG. 2, in the optical disc apparatus 1, the controlling section 20 causes the pickup driving circuit 13 to move the optical pickup 12 to a position corresponding to a track (which is not shown) of the optical disc 100 while the optical disc 100 is being rotated.

The optical pickup 12 includes the optical head 11. The controlling section 20 sets a recording condition by using the laser driving circuit 14 and the like. The controlling section 20 causes the optical head 11 to irradiate a storage region of the optical disc 100 with a recording laser beam so as to record information on the track of the optical disc 100.

In the optical disc apparatus 1, also, the controlling section 20 causes the pickup driving circuit to move the optical pickup 12 to a position corresponding to the storage region of the optical disc 100. Then, the controlling section 20 sets a reproduction condition by using the laser driving circuit 14 and the like. The controlling section 20 controls the optical head 11 to irradiate the optical disc 100 with a reproducing laser beam.

Light reflected by the optical disc 100 is detected by the optical head 11, and converted into reproduction signal by the reproduction circuit 15. Then, the reproduction signal is supplied to the controlling section 20. In this way, the optical disc apparatus 1 reproduces the information recorded on the track (which is made up of a plurality of sectors) of the optical disc 100.

The optical disc apparatus 1 includes the disc loading detecting section 6. The disc loading detecting section 6 detects loading of the optical disc 100. For example, various sensors can be exemplified as the disc loading detecting section 6. Any sensor can be used as the disc loading detecting section 6, provided that it can detect the loading of the optical disc 100.

The disc loading section 6 sends, in form of a detection signal, a result of detection to the controlling section 20.

The operation section 7 is for allowing a user to input various operation instructions to, the optical disc apparatus 1. For example, the operation section 7 can be operation buttons and their interfaces, and the like.

With reference to FIG. 1, the following describes a configuration of the main section (the controlling section 20 and the like) of the optical disc apparatus 1.

As shown in FIG. 1, the storage section 3 includes (i) a storage layer—storage area association table storage section 31, (ii) a layer number—storage layer association table storage section 32, (iii) a layer type identification result storage section 33, (iv) a recording and reproduction control scheme setting information (recording condition/reproduction condition) storage section 34, and the like. Each of the storage sections (i) through (iv) permanently or temporarily stores therein data necessary for information computation or processing by the controlling section 20. The storage section 3 also stores therein a program (which is not shown) that operates the controlling section 20.

The storage layer—storage area association table storage section 31 stores therein table information in advance. The table information indicates relationships of how storage areas A1 through A8 . . . in a management information region 101 of the optical disc 100 (which are later discussed) are associated with layer locations of the respective information storage layers of the optical disc 100. The layer locations are locations of these information storage layers with respect to a direction in which the reproducing light enters the optical disc 100.

The layer number—storage layer association table storage section 32 stores therein table information in advance. The table information indicates relationship of how layer numbers (pieces of layer number information) are associated with the respective layer locations of the information storage layers of the optical disc 100. The layer numbers are recorded in address information storage regions 107 of the respective information storage layers and discriminate the respective corresponding information storage layers from each other.

The layer type identification result storage section 33 stores therein an identification result obtained by the layer type identifying section 223 identifying a type of that of the information storage layers of the optical disc 100 which has been accessed (the information storage layer having been accessed is hereinafter referred to as an accessed information storage layer).

"Access" herein means reproducing information recorded in the optical disc 100 or recording information in the optical disc 100.

"Having accessed" or "accessed" herein means having accessed an information storage layer, but does not mean being going to access the information storage layer.

The recording and reproduction control scheme setting information storage section 34 stores therein pieces of recording and reproduction information (recording conditions and reproduction conditions) in advance, any of which pieces of recording and reproduction information is set based on a type of a specification of a corresponding information storage layer or a type of a storage property of the corresponding information storage layer.

With reference to FIG. 1, the following describes a configuration of the main section (the controlling section 20) of the optical disc apparatus 1.

As shown in FIG. 1, the controlling section 20 includes a disc management section 21, a reproduction controlling section 22, a recording controlling section (recording condition setting means) 23, and a reproduction circuit group controlling section 24.

The disc management section 21 controls the operations of the reproduction controlling section 22, the recording controlling section 23, and the like, by receiving, from the disc loading detecting sensor 6, the detection signal indicating that the disc 100 is loaded and by identifying a structure of the optical disc 100 from the identification information obtained from the optical disc 100.

The reproduction controlling section 22 controls the reproduction of information (mainly information stored in the optical disc 100) by operating (i) a layer type information obtaining section (layer type information obtaining means) 221, (ii) a layer number obtaining section (layer number obtaining means, accessed layer determining means) 222, (iii) a layer type identifying section (accessed layer type identifying means) 223, and (iv) a reproduction control scheme setting section (reproduction condition setting means) 224, and the like.

The reproduced data holding section 225 carries out data transmission and data reception by (i) receiving and temporarily storing the layer type information and the layer number (layer number information) respectively obtained by the layer type information obtaining section 221 and the layer number obtaining section 222 and (ii) sending the layer type information and the layer number to the layer type identifying section 223.

The layer type information obtaining section 221 obtains (reads out) the layer type information (i) being recorded in each of the storage areas A1 through A8 . . . included in the management information region 101 of the optical disc 100 and (ii) indicating a type of the information storage layer in which the layer type information is recorded.

The layer type information thus obtained by the layer type information obtaining section 221 may be constantly stored, in the storage section 3, in association with identification information of the optical disc 100 by the disc management section 21 (this is not shown in the figures).

In this case, it is preferable that when the optical disc 100 is loaded again, the disc management section 21 obtains, from the storage section 3, the layer type information corresponding to the identification information of the optical disc 100 and then sends the layer type information to the layer type information obtaining section 221.

In such circumstance, it is not necessary that the layer type information obtaining section 221 reobtains the layer type information of the same optical disc 100. Therefore, even in a case where a storage information layer of the optical disc 100 is accessed without reading the management information region 101 prior to the access, it is still possible to identify a type of the information storage layer with certainty.

Examples of the "layer type information" are (i) information indicating a type of a storage property of an information storage layer such as a rewritable information storage layer, a read-only information storage layer, a recordable information storage layer, or the like, (ii) information indicating a type of a specification such as DVD, BD, or the like, and (iii) the like information.

The layer number obtaining section 222 obtains (reads out), from address information recorded in the accessed storage information layers of the optical disc 100, a layer number (layer number information) discriminating the accessed information storage layer from the rest of the information storage layers.

With the arrangement, by including the layer type information in the address information that specifies a location on the optical disc 100, it is possible to obtain the layer number information at any accessible location within a radius range of the optical disc 100 in a medium plane direction.

The layer number obtaining section 222 may be configured such that, in a case where the storage locations, where the layers numbers of the information storage layers are recorded in the address information regions 107 of the respective information storage layers, are different depending on types of the respective corresponding information storage layers, the layer number obtaining section 222 obtains a layer number of the accessed information storage layer at a storage location determined depending on a type of the accessed information storage layer (see FIG. 9).

Alternatively, the layer number obtaining section 222 may obtain the layer number of the accessed information storage layer at the storage location determined based on the layer type information obtained by the layer type information obtaining section 221.

According to the arrangement, the storage locations where the layer numbers are recorded in the address information storage regions 107 of the respective information storage layers of the optical disc 100 are different depending on the types of the respective corresponding information storage layers. Therefore, even in a case of dealing with information storage mediums of different specifications, for example, it is possible to discriminate information storage layers having same layer numbers.

That is, for example, it is possible to distinguish between (i) RE layers in a two-layered disc having the two RE layers and (ii) an RE layer in a two-layered combination disc having an ROM layer and the RE layer.

Instead of the layer type identifying section 223 (which is later discussed), the layer number obtaining section (accessed layer determining means) 222 may determine which of the information storage layers has been accessed, based on the layer number.

According to the arrangement, it is possible to determine, which of the information storage layers of the optical disc 100 has been accessed.

Thus, by giving different layer numbers to the respective information storage layers of the optical disc 100, it is possible to make, it easy to identify information storage mediums.

The "layer number" can be any information, provided that it helps determining which of the information storage layers has been accessed.

Examples of the "layer numbers" can be binary expressed numbers or the like of the information storage layers that are sequentially numbered in a direction from (i) that of the information storage layers which is closest to a substrate (which is not shown) of the optical disc 100 (information storage layer closest to a side opposing to the side on which the reproducing light enters the optical disc 100) to (ii) that of the information storage layers which is farthest from the substrate of the optical disc 100.

Other example of the "layer numbers" can be binary expressed number or the like of the information storage layers that are sequentially numbered in a direction from (i) that of the information storage layers which is closest to the side on which light enters the optical disc 100 to (ii) that of the information storage layers which is farthest from the same side.

The information storage layers may be numbered sequentially in an increasing order (see a storage layer_example 1 shown in (b) of FIG. 4) or in a descending order (see a storage layer_example 2 shown in (b) of FIG. 4), or alternatively may be numbered in a random order (see a storage layer_example 3 shown in (b) of FIG. 4).

The layer type identifying section 223 reads out, from the reproduced data holding section 225, the layer number obtained by the layer number obtaining section 222. Then, the layer type identifying section 223 refers to the layer number—storage layer association table according to the layer number thus read out, so as to determine which of the information storage layers has been accessed.

According to the arrangement, it is possible to determine which of the information storage layers of the optical disc 100 has been accessed.

The layer type identifying section 223 identifies a type of the accessed information storage layer among the information storage layers of the optical disc 100, by referring to (i) the layer type information stored in a corresponding one of the storage regions A1 through A8 and obtained by the layer type information obtaining section 221 and (ii) the storage layer—storage area association table stored in the storage section 3.

Examples of "types of the information storage layers" encompass (i) types of storage properties of information storage layers such as rewritable RE layers, read-only ROM layers, recordable R layers, or the like, and (ii) types of specifications such as DVD, BD, or the like.

The reproduction control scheme setting section 224 sets, based on the type of the accessed information storage layer identified by the layer type identifying section 223, a reproduction condition in which information recorded in the accessed information storage layer is reproduced.

Under the reproduction condition thus set up, the reproducing controlling section 22 of the optical disc apparatus 1 carries out the reproduction of the information recorded in the accessed information storage layer.

It is thus possible to set up the reproduction condition that matches a reproduction condition suitable for the accessed information storage layer, even in a case where an unintended one of the information storage layers is accessed due to false operation by the optical disc apparatus 1 or the like.

Examples of the "reproduction conditions" can be settings for the reproduction control (such as settings of focus control, tracking control, reproducing power control, and the like).

The recording controlling section 23 controls the recording of information into the optical disc 100, by driving the recording and reproduction circuit group 10 via the recording and reproduction circuit group controlling section 24 and thereby carrying out the tracking control in the optical pickup 12, the focus control in the optical head 11, and the like.

The recording controlling section 23 sets up the recording conditions for information recording in the accessed information storage layer, based on the type of the accessed information storage layer identified by the layer type identifying 223.

It is thus described that the recording controlling section 23 has a function to set up the recording conditions. Note here, that the recording controlling section 23 may be configured similarly to the reproduction controlling section 22 so as to include the layer type information obtaining section 221, the layer number obtaining section 222, the layer type identifying section 223, the reproduced data holding section 225, and, instead of the reproduction control scheme setting section 224, the recording control scheme setting section (which is not shown).

Alternatively, the recording controlling section 23 my include only the recording control scheme setting section (which is not shown) and share the layer type information obtaining section 221, the layer number obtaining section 222, the layer type identifying section 223, and the reproducing data holding section 225 of the reproducing controlling section 22 with the reproducing controlling section 22.

Alternatively, the recording controlling section 23 may include only the recording control scheme setting section (which is not shown) and share the layer type information obtaining section 221, the layer type information obtaining section 221, the layer type identifying section 223, and the reproduced data holding section 225 of the reproducing controlling section 22 with the reproducing controlling section 22.

The recording controlling section 23 records the information in the accessed information storage layer in conformity with the recording conditions thus set up.

It is thus possible to set up a recording condition that matches recording condition suitable for information recording in the accessed information storage layer, even in a case where an information storage layer different from an intended information storage layer is accessed due to the false operation by the optical disc apparatus 1 or the like.

Examples of the "recording condition" can be setting for the recording control (setting conditions of the focus control, the tracking control, the recording power, or the like, for example).

It is thus possible to identify the type of the accessed information storage layer, even in a case where an information storage layer different from an intended one is accessed due to false operation by the optical disc apparatus 1 or the like.

Thus, it is possible to properly setting the recording or reproduction control scheme or the like, based on an identified type of the information storage layer, whereby it is possible to dissolve mismatching between the recording or reproduction control scheme or the like thus set up and a recording or reproduction control scheme suitable for information recording or reproducing in/from the accessed information storage layer.

[2. Configuration of Information Storage Medium]

With reference to FIG. 3, the following describes a configuration of the optical disc (information storage medium) 100 according to the one embodiment of the present invention.

FIG. 3 is a view schematically showing a configuration of the optical disc 100 according to the one embodiment of the present invention. (a) of FIG. 3 shows the optical disc 100 from the side on which the reproducing light enters the optical disc 100. (b) of FIG. 3 shows a partial cross section of the information storage medium.

As shown in (a) and (b) of FIG. 3, the optical disc 100 has a region roughly divided into two regions that are a management information region (management information storage region) 101 and a user storage region 102.

The management information region 101 is a storage region where no tracking control is required to access thereto, or a region accessible by simply carrying out the focus control.

The pieces of layer type information of the optical disc 100, which are recorded in the management information region 101 that is easily accessible, can be easily obtained at once in the management information region 101.

The user storage region 102 is made up of a plurality of tracks (which are not shown). The plurality of tracks are made up of respective pluralities of sectors.

A sector 106 shown in (a) of FIG. 3 is one of the pluralities of sectors. In (a) of FIG. 3, the sector 106 is illustrated with exaggeration in size.

The sector 106 is provided with an address information storage region 107. The address information storage region 107 is made up of a layer number storage region B1 and a sector number storage region B2.

A layer number is recorded in the layer number region B1 of the present embodiment. The layer number indicates a rank of a corresponding information storage layer among the entire layer information storage layers in terms of closeness to the substrate (which is not shown) (the substrate is located on a side opposing to the side on which the reproducing light enters the optical disc 100).

For example, the optical disc 100 has eight information storage layers L0 (which is closest to the substrate) through L7 (which is farthest from the substrate). In this case, if pieces of layer number information that are stored in layer number storage regions B1 of the respective information storage layers L0 through L7 are expressed in a binary system using "1" and "0", the layer number information of the information storage layer L0 is "000", the layer number information of the information storage layer L1 is "001", and so on.

Here, by describing "provided with an address information storage region 107", it is intended to encompass a case in which the address information is recorded by wobbling (meandering) a track including the sector 106 or the like case, in addition to a case in which the address information is directly recorded in pits.

Address information may be directly recorded in pits in a ROM layer, and different pieces of address information may be recorded by wobbling tracks in respective RE and R layers.

(a) of FIG. 3 conceptually shows a storage capacity of the address information storage region 107. (a) of FIG. 3 merely shows that a part of the entire storage capacity of the address information storage region 107 resides in the layer number storage region B1 and the rest of the entire storage capacity of the same resides in the sector number storage region B2.

As shown in (b) of FIG. 3, the optical disc 100 is a multi-layered storage medium having the information storage layers L0 through L7 sequentially provided from the opposing side to the side on which the reproducing light enters the optical disc 100 (which opposing side is the side close to the substrate (which is not shown)).

(b) of FIG. 3 shows that reproducing light R emitted from the optical head 11 enters the optical disc 100 in such a manner that a light spot of the reproducing light R is located at a light spot location S of the information storage layer L1.

Here, the information storage layer L0 is an RE layer and has a management information region 101 provided close to an inner edge of the optical disc 100. The management information region 101 is made up of a BCA (Burst Cutting Area) 103 and PIC (Permanent Information and Control data) 104.

The BCA 103 mainly stores therein the identification information indicating a structure of the optical disc 100.

Concrete examples of the identification information can be disc layer types (read-only type, recordable type, and rewritable type), a disc size, a disc version (which is associated with speed or the like), standard conditions suitable for information recording and reproducing in/from a disc, a servo polarity, a polarity of a recording mark, a number unique to the disc, and the like. A storage order (or layout method) in which such pieces of identification information are recorded in the BCA 103 of each information storage layer can be any. The storage order is generally determined by a specification or the like.

In the present embodiment, different pieces of layer type information are recorded in the respective storage areas A1 through A8 of the layer type information storage region 105 included in the BCA 103. Where the layer type information storage region 105 is located in the BCA 103 can be freely determined.

[3. Information Recorded in Information Storage Medium]

With reference to (a) through (d) of FIG. 4, the following describes concrete examples of information recorded in the optical disc 100.

The following deals with a case in which the information storage layers of the optical disc 100 are eight information storage layers L0 through L7. In the following description, a total bit size of the address information storage region 107 of each information storage layer is 32 bits. A portion of the address information that accounts for 8 bits out of the total bit size of 32 bits is recorded in a corresponding layer number storage region B1, whereas the other portion of the address information that accounts for 24 bits out of the total bit size of 32 bits is recorded in the sector number storage region B2.

(a) of FIG. 4 shows examples of pieces of layer type information recorded in the respective storage areas A1 through A8 . . . .

In the present embodiment, different pieces of layer type information "01", "10", and "11" indicate an ROM layer, an RE layer, and an R layer, respectively. However, associations between 2-bit binary numbers and layer types are not limited to this and can be any. Layer type information "00" indicates an absence of an information storage layer, that is, no information storage layer is provided.

In (a) of FIG. 4, the layer type information recorded in the storage area A1 is "10". This indicates that a type of an information storage layer associated with the storage area A1 is an RE layer.

The pieces of layer type information recorded in the respective storage areas A2 through A4 are "01". This indicates that types of information storage layers associated with the respective storage areas A2 through A4 are ROM layers.

The pieces of layer type information recorded in the respective storage areas A5 through A8 are "00". This indicates that no information storage layer is associated with any of the storage areas A5 through A8. It follows that the number of the information storage layers of the optical disc 100 is four.

(b) of FIG. 4 shows examples of the storage layer—storage area association table stored in the storage layer—storage area association table storage section 31 of the storage section 3.

A "storage layer—example 1" shows that the storage areas A1 through A8 are associated with the respective information storage layers L0 through L7 in this sequential order.

A "storage layer—example 2" shows that the storage areas A1 through A8 are associated with the respective information storage layers L7 through L0 in this sequential order.

The "storage layer—example 3" shows that the storage areas A1 through A8 are associated with the respective information storage layers L7 through L0 in a random order.

(c) of FIG. 4 shows four examples (examples 1 through 4) of the layer numbers and the sector numbers respectively recorded in the layer number storage region B1 and the sector number storage region B2 of the address information storage region 107 of the sector 106.

(d) of FIG. 4 shows one example of the layer number—storage layer association table stored in the layer number—storage layer association table storage section 32.

Here, as shown in (d) of FIG. 4, layer numbers associated with the respective information storage layers L0 through L7 are "000" through "111".

In the example shown in (d) of FIG. 4, the information storage layers L0 through L7 are associated with the respective layer numbers in such an orderly ascending manner that the layer numbers expressed in the binary numbers thus associated with the respective layers L0 through L7 are greater in this order. However, the preset embodiment is not limited to this. The information storage layers L0 through L7 may be associated with the respective layer numbers in such an orderly descending manner that the layer numbers expressed in the binary numbers thus associated with the respective information storage layers L0 through L7 are smaller in this order. Alternatively, the information storage layers L0 through L7 may be associated with the respective layer numbers in a random manner.

In the example 1 shown in (c) of FIG. 1, the layer number recorded in the layer number storage region B1 of the information storage layer is "000". As such, the layer number obtaining section 222 determines that the information storage layer L0 has been accessed.

In the example 2, the layer number recorded in the layer number storage region B1 is "001". As such, the layer number obtaining section 222 determines that the information storage layer L1 has been accessed.

In the example 3, the layer number recorded in the layer number storage region B1 is "010". As such, the layer number obtaining section 222 determines that the information storage layer L2 has been accessed.

In the example 4, the layer number recorded in the layer number storage region B1 is "011". As such, the layer number obtaining section 222 determines that the information storage layer L3 has been accessed.

The optical disc 100 is thus the information storage medium having the plurality of information storage layers of two or more different types. The address information is recorded in the address information storage region 107 of each information storage layer and contains the layer number for discriminating the information storage layer, with which the layer number is associated, from the rest of the plurality of information storage layers of the optical disc 100. Further, the pieces of layer type information indicating the types of the respective corresponding information storage layers are recorded in the management information region 101.

Thus, the optical disc 100 can be provided in which optical disc 100 it is possible to (i) obtain the layer number from the address information recorded in the address information storage region 107 of the accessed information storage layer and (ii) obtain the layer type information in the management information region 101 of the accessed information storage layer.

[4. Operation of Information Recording and Reproducing Apparatus]

With reference to FIGS. 1 and 5 though 7, the following describes how the optical disc apparatus 1 operates. FIGS. 5 through 7 are flow charts showing the layer type information obtaining step, the layer number obtaining step, and the recording and reproduction condition setting step, respectively.

The present embodiment deals with a case in which a step of identifying a type of one information storage layer carries out the layer type information obtaining step, the layer number obtaining step, and the recording and reproduction condition setting step in this order. However, an order in which the layer type information obtaining step and the layer number obtaining step are carried out can be any order.

(4-1. Layer Type Information Obtaining Step)

The following describes the layer type information obtaining step shown in FIG. 5.

As shown in FIG. 5, in a step S1 (hereinafter the word "step" is omitted) of the layer type information obtaining step, the disc loading detecting section 6 (see FIG. 1) detects that the optical disc 100 is loaded, and then informs the disc management section 21 of the loading of the optical disc 100. After this, the layer type information obtaining step proceeds to S2.

In S2, the disc management section 21 informs the reproduction controlling section 22 that the optical disc 100 is loaded (loading notice). Then, the disc management section 21 gives the reproduction controlling section 22 an instruction (identification information holding instruction) to obtain the identification information recorded in the BCA 103 of the optical disc 100 and store it in the storage section 3.

In response to the loading notice and the identification information holding instruction received from the disc management section 21, the reproduction controlling section 22 drives the recording and reproduction circuit group 10 via the recording and reproduction circuit group controlling section 24 so as to move the optical pickup 12 to near the BCA 103 (including the layer type information storage region 105) of the optical disc 100. After this, the layer type information obtaining step proceeds to S3.

In S3, the reproduction controlling section 22 drives the recording and reproduction circuit group 10 via the recording and reproduction circuit group controlling section 24 so as to control the optical head 11 in such a manner that light emitted from the optical head 11 is focused on the information storage layer L0 in which the BCA 103 (including the layer type information storage region 105) of the optical disc 100 is provided. In such circumstance, information stored in the BCA 103 can be reproduced. After this, the layer type information obtaining step proceeds to S4. At this time, no tracking control is required.

In S4, the reproduction controlling section 22 obtains the identification information of the optical disc 100 recorded in the BCA 103 and stores it in the storage section 3.

The light spot location S of reproducing light R emitted to the BCA 103 is moved to the layer type information storage region 105 so that the layer type information is reproduced. The layer type information obtaining section 221 stores, in the reproduced data holding section 225 or the storage section 3, the layer type information thus reproduced. After this, a process proceeds to the connector "A".

The above description discusses a case in which the layer type information obtaining section 221 directly reads out, from the optical disc 100, the layer type information recorded in the BCA 103.

As one alternative, the present invention may be configured such that the identification information of the optical disc 100 is stored in advance, in association with layer type information recorded in the BCA 103, in the storage section 3, and if identification information of the optical disc 100 is identical with the discrimination information thus stored in advance, the layer type information obtaining section 221 reads out the layer type information being stored in advance and corresponding to the optical disc 100.

As another alternative, the layer type information obtaining section 221 may read out the layer information in still another way in a case where a storage manner of the layer type information is determined by the specification of the optical disc 100 or the like. Specifically, identification information corresponding to that of the optical disc 100 is stored in advance in the storage section 3, so that the layer information obtaining section 3 can read out it from the storage section 3.

According to the configurations, it is impossible to identify, by simply obtaining a layer number, the type of the accessed information storage layer. However, it is possible to identify the type of the accessed information storage layer (which type is any of R layer, RE layer, and ROM layer, or the like), based on the layer type information recorded in the BCA 103, the layer type information read out from the BCA 103, or the layer type information recorded in advance in the storage section 3.

(4-2. Layer Number Obtaining Step)

The following describes the layer number obtaining step shown in FIG. 6. As shown in FIG. 6, the process is continued from the connector "A", and the layer number obtaining step proceeds to S5.

In S5, a user (see FIG. 1) operates the operation section 7 so as to give an instruction (recording reproducing instruction) to record or reproduce information in/from a target layer. In response to the instruction thus given, the reproduction controlling section 22 drives the recording and reproduction circuit group controlling section 24 so as to carry out (i) focus control in which the optical head 11 is focused on the target layer (which is the L1 layer in this case) and (ii) tacking control in which the optical pickup 12 tracks light reflected by the target layer. Thereafter, the address information stored in the address information storage region 107 of the optical disc 100 is reproduced.

Here, the layer number obtaining section 222 temporarily stores, in the reproduced data holding section 225 or the storage section 3, the layer number "001" that has been read out from the address information recorded in the address information storage region 107 of the optical disk 100. Thereafter, the layer number obtaining step proceeds to S6.

In S6, the layer type identifying section 223 reads out the layer number "001" thus stored in the reproduced data holding section 225 or the storage section 3. Then, based on the layer number "001" thus read out, the layer type identifying section 223 refers to the layer number—storage layer association table (see (d) of FIG. 4) stored in the layer number—storage layer association table storage section 32 of the storage section 3. By this, the layer type identifying section 223 determines that the layer L1 has been accessed.

Then, the layer type identifying section 223 refers to the storage layer—storage area association table (in this case, which is the storage layer—example 1 shown in (b) of FIG. 4) stored in the storage layer—storage area association table storage section 31 of the storage section 3, and detects that the storage area in which the layer number information associated with the layer L1 is stored is "A2".

Then, based on the layer type information (see (a) of FIG. 4) held in the reproduced data holding section 225 or the storage section 3, the layer type identifying section 223 determines that a piece of layer type information corresponding to the storage area "A2" is "01", that is, the information storage layer L1 having been accessed is a ROM layer. After this, the layer type identifying section 223 stores a result of determining (layer type identification result) in the layer type identification result storage section 33 of the storage section 3. Thereafter, the process proceeds to the connector "B".

(4-3. Recording/Reproduction Condition Setting Step)

The following describes the recording and reproduction condition setting step shown in FIG. 7. As shown in FIG. 7, the process is continued from the connector "B", and the recording/reproduction condition setting step proceeds to S7.

The result has thus been stored in the layer type identification result storage section 33. Thereafter, in S7, (i) the reproduction control scheme setting section 224 refers to the reproduction condition stored in the recording and reproduction control scheme setting information storage section 34 of the storage section 3, and the reproduction controlling section 22 drives the recording and reproduction circuit group 10 to set the reproduction control scheme suitable for the information storage layer L1 (a case where information reproduction is carried out), or the recording controlling section 23 refers to the recording condition stored in the recording and reproduction control scheme setting information storage section 34 of the storage section 3, and then drives the recording and reproduction circuit group 10 to set the recording control scheme suitable for the information storage layer L1 (a case where information recording is carried out). Thereafter, the recording/reproduction condition setting step proceeds to S8.

In S8, (i) the reproducing controlling section 22 reproduces, in the reproduction control scheme thus set, information stored in the information storage layer L1, or (ii) the recording controlling section 23 records information in the information storage layer L1 in the recording control scheme. Thereafter, the recording/reproduction condition setting step proceeds to S9.

In a case where the user has given, via the operation section 7, an instruction to record or reproduce information in/from an information storage layer other than the information storage layer L1, "YES" is selected in S9, and the process proceeds to the connector "C".

On the other hand, in a case where the user has given no such instruction via the operation section, "No" is selected and the process is ended at "END".

In a case where the process proceeds to the connector "C", it returns to S5, as shown in FIG. 6.

[5. Various Use Embodiments of Address information Storage Regions]

The following describes various use embodiments of address information storage regions with reference to (a) and (b) of FIG. 8 and (a) and (b) of FIG. 9.

(a) of FIG. 8 shows another example of the use embodiments of the address information storage regions.

In the example shown in (a) of FIG. 8, an address information storage region 107 includes three storage regions which are a layer type (layer type information) storage region C1, a layer number (layer number information) storage region C2, and a sector number storage region C3.

That is, layer type information is included in address information of an optical disk 100.

The layer type information is thus included in the address information that specifies a location on the optical disc 100. According to the arrangement, the layer type information can be obtained at any accessible point within a radius range of the optical disc 100 in a medium plane direction.

According to such a use embodiment of the address information storage region 107, it is possible to directly obtain the layer type information in an accessed information storage layer. Therefore, even in a case of not reproducing information stored in a management information region 101 and directly accessing the information storage layer, it is still possible to identify a layer type of the accessed information storage layer.

For example, in the example shown in (a) of FIG. 8, based on a layer number "000" stored in the layer number storage region C2 of the address information storage region 107, the accessed information storage layer can be identified as an information storage layer L0. Also, based on the layer number "01" stored in the layer number storage region C2 of the address information storage region 107, it can be determined that the information storage layer L0 is an RE layer.

(b) of FIG. 8 shows still another example of the use embodiments of the address information storage region.

In the example shown in (b) of FIG. 8, a layer number "01" is stored in a layer number (layer number information) storage region D1, and a total bit size of the layer number "01" is smaller than that of a layer number "001" stored in a layer number (layer number information) storage region B1.

This is made in consideration that, because a total bit size of address information stored in the address information storage region 107 is fixed (for example, in a DVD, a total bit size of address information is 32 bits, of which 24 bits reside in a sector number storage region and 8 bits reside in other storage regions), a bit size of information other than a sector number is limited.

In a case where the information storage layer, where a super-resolution film is provided to the optical disc 100, has an increased storage density, there is a chance that the total bit size of the sector number stored in the sector number storage region D2 is increased. In this case, therefore, the sector number storage region D2 should have an increased area, whereas a layer number storage region B1 should have a decreased area.

The following describes yet another example of the use embodiments of the address information storage regions.

The following describes a use embodiment of the address information storage region 107 in which use embodiment a part of the layer number storage region can function also as the layer type information storage region.

For example, assume a case in which the optical disc 100 is a two-layer combination disc having an RE layer and a ROM layer, in which optical disc 100 a total bit size of the layer number storage region is three bits.

The ROM layer is associated with a layer number "000" and the RE layer is associated with a layer number "100".

That is, in the layer number "000" associated with the ROM layer, a most significant one bit of three bits of the layer number "000" is "0", whereas in the layer number "100" associated with the RE layer, a most significant one bit of three bits of the layer number "100" is "1".

In other words, by obtaining a most significant one bit of three bits of any layer number, it is possible to identify a type of an information storage layer associated with this layer number.

According to the layer numbers thus associated with the respective information storage layers, it is possible to use a most significant one bit of three bits of each layer number storage region as layer type information storage region. That is, by associating the information storage layers with the respective layer numbers each including layer type information stored in the layer number storage region, it is possible to cause reductions in regions being used.

In a case where the number of information storage layers is increased, each ROM layer is associated with any of "000", "001", "010", and "011", whereas each RE layer is associated with any of "100", "101", "110", and "111".

That is, by obtaining a most significant one bit of three bits of any layer number stored in a layer number storage region, it is possible to identify a type of an information storage layer associated with the layer number.

By thus associating the information storage layers with the layer numbers, it is possible to use a most significant one bit of three bits of each layer number storage region as a layer type information storage region.

This brings about the following effect even in a case where the number of information storage layers is increased. That is, by associating the information storage layers with the layer numbers including respective pieces of layer type information in the layer type information storage regions, it is possible to reduce the area being used.

The description above discusses the case in which the most significant one bit of three bits of each layer number storage region is used as a layer type information storage region. Instead of the most significant one bit, a least significant one bit of three bits of the layer number storage region may be used as the layer type information storage region. Alternatively, most significant two bits of three bits of the layer number storage region may be used as the layer type information storage region.

In the example shown in (a) and (b) of FIG. 9, an example is discussed in which example a storage location, at which address information is stored in an address information storage region 107 of an information storage layer, is different depending on a type of the information storage layer. For easy explanation, the following description deals with a case in which the optical disc 100 has two layers.

In the following description, the optical disc 100 is a two-layered combination disc having an RE layer and a ROM layer.

In a case where the optical disc. 100 is the two-layered combination disc having the RE layer and the ROM layer (this type of the two-layered combination disc is referred to as a ROM-RE disc), it is possible to reduce disc manufacturing cost by preparing (i) the ROM layer of the ROM-RE disc by use of a ROM stamper for use in preparation of both ROM layer of a ROM disc and the ROM layer of the ROM-RE disc and (ii) the RE layer of the ROM-RE disc by use of an RE stamper for use in preparation of both an RE layer of an RE disc and the RE layer of the ROM-RE disc.

Usually, a cost required, for preparing the ROM layer stamper is greater than costs required for preparing an R layer stamper and the RE layer stamper. In view, for manufacturing of the ROM-RE disc, it is preferable to prepare at least the ROM layer thereof with the use of the ROM layer stamper for use in preparation of both a ROM layer of a ROM disc and the ROM layer of the ROM-RE disc.

However, in a case where the ROM-RE disc is manufactured by preparing both the ROM and RE layers thereof by using the ROM stamper for use in preparation of ROM layers of both the ROM disc and the ROM-RE disc, and the RE stamper for use in preparation of RE layers of both the RE disc and the ROM-RE disc, it is usually the case that layer numbers stored in predetermined storage locations (e.g., the storage location shown in (a) of FIG. 9 is a conventional layer number storage location) of the respective ROM and RE layers are "0" which indicates that only a single layer is provided.

In such an event, since the layer numbers of both information storage layers are "0", it is difficult to determine which of the information storage layers has been accessed, based on mere reproduction of the address information.

In this regard, it is impossible to prepare both the ROM and RE layers of the ROM-RE disc by sharing the ROM layer stamper and the RE layer stamper with the preparation of the ROM disc and the RE disc, respectively. It is thought that in such circumstances, the ROM layer is usually prepared with the use of the ROM layer stamper shared with the preparation of the ROM layer of the ROM disc, whereas the RE layer is prepared, by use of an RE layer stamper not shared with the preparation of the RE disc, because the ROM layer stamper is more expensive than the RE layer stamper.

In other case, it is optional to associate an RE layer, which is an information storage layer L0, with a layer number "1" different from a layer number "0". However, such a method gives rise to the following problem.

That is, in a case where the optical disc 100 is the two-layered combination disc having the RE layer and another RE layer (this type of the two-layered combination disc is referred to as an RE-RE disc), if layer numbers of both of the RE layers are "1", it is impossible to distinguish between information storage layers L0 and L1.

With such incapability, the information recording and reproducing apparatus has the following risk. In a case where the information recording and reproducing apparatus is an apparatus that carries out information reproduction or the like without reproducing information stored in BCA, it usually tries to obtain reproduction information in the information storage layer L0. As such, even in a case where the information storage layer L0 of the RE-RE disc is accessed, the information recording and reproducing apparatus falsely detects that it has accessed an information storage layer L1 of a ROM-RE disc. Therefore, it attempts to jump to an imaginary information storage layer L0 of the disc falsely detected as a ROM-RE disc.

However, since the information storage layer L0 of the RE-RE disc has been accessed, there is a risk that layer jump is repeatedly carried out on a permanent basis.

In view, it is required that the layer number of the RE layer of the ROM-RE disc be stored at a location at least different from a usual location, that is, it is necessary that the layer number of the RE layer of the ROM-RE disc be located at the location different from a location at which a layer number in address information is stored in the ROM layer of the ROM-RE disc.

In view of the above, in the optical disc 100, the storage location at which the layer number is stored in the address information storage region 107 may be different depending on a type of an information storage layer, as shown in (b) of FIG. 9 (the storage location shown in (b) of FIG. 9 is a reserved region in a former specification).

In this case, the layer number obtaining section 222 of the optical disc apparatus 1 is configured so as to obtain the layer number at the storage location different depending on the type of the information storage layer that has been accessed.

It is preferable that the layer number obtaining section 222 of the optical disc 1 obtains the layer number at the storage location, based on layer type information obtained by the layer type information obtaining section 221 or, in a case where layer type information is stored in advance in the storage section 3, the layer, type information thus stored.

The layer number is thus stored, in the address information storage region, at the storage location different depending on the type of the information storage layer. Therefore, for example, it is possible to distinguish between information storage layers that are included in respective information storage mediums of different specifications and associated with same layer numbers.

That is, for example, it is possible to distinguish between RE layers of a two-layer combination disc having the two RE layers and a RE layer of a two-layer combination disc having a ROM layer and the RE layer.

The present invention may also be described as follows.

That is, the information recording and reproducing apparatus of the present invention may be an information recording and reproducing apparatus that reproduces information stored in a multi-layered optical storage medium having a plurality of layers of different types, the information recording and reproducing apparatus including: reproducing means for irradiating the multi-layered optical storage medium with a laser beam and reading out light reflected from the multi-layered optical storage medium; layer number obtaining means for obtaining a layer number stored in that of the plurality of layers of different types which has been accessed; layer type information obtaining means for obtaining layer type information associated with the layer number stored in a management information region(s) of one or more of the plurality of layers of different types; and layer type identifying means for identifying a type of that of the plurality of layers of different types which has been accessed, based on the layer number obtained by the layer number obtaining means and the layer type information obtained by the layer type information obtaining means.

Further, the information recording and reproducing apparatus of the present invention may be configured so that the layer number region is included in address information.

Further, the information recording and reproducing apparatus of the present invention may be configured so that the management information region includes a region reproducible without tracking control.

Further, the information recording and reproducing apparatus of the present invention may be an information recording and reproducing apparatus that reproduces information stored in a multi-layered optical storage medium having a plurality of layers of different types, the information recording and reproducing apparatus including: a reproducing step of irradiating the multi-layered optical storage medium with a laser beam and reading out light reflected from the multi-layered optical storage medium; a layer number obtaining step of obtaining a layer number stored in an accessed layer, which is a layer that is accessed among the plurality of layers of different types; a layer type information obtaining step of obtaining layer type information associated with the layer number stored in a management information region of at least one of the plurality of layers of different types; and layer type identifying step of identifying a type of the accessed layer, based on the layer number obtained by the layer number obtaining means and the layer type information obtained by the layer type information obtaining means.

Further, the information recording and reproducing apparatus of the present invention may be configured so that the layer number obtaining means obtains, based on the layer type information obtained by the layer type information obtaining means, the layer number from address information associated with the layer type.

The information storage medium of the present invention may include a management information region that stores therein (i) pieces of address information of a respective plurality of layers, which pieces of address information include respective layer numbers, and (ii) pieces of layer type information of the respective plurality of layers.

The information storage medium of the present invention may include at least a read-only information reproduction layer (ROM) and an information storage and reproduction layer (R, RE), wherein the information storage layer stores an address and the layer number at such storage locations whose positional relationship is different from a positional relationship between an address and the layer number stored in another information storage layer, the addresses specifying in-plane locations of the respective corresponding information storage layers and being included in different, pieces of address information stored in the respective information storage layers.

An information storage medium of the present invention can be an information storage medium having a plurality of information storage layers of two or more different types, wherein each information storage layer stores therein layer number information discriminating the information storage layer from the rest of the plurality of information storage layers, and at least one of the information storage layers stores, in a management information region thereof, layer type information indicating types of the respective plurality of information storage layers.

Further, the information storage medium of the present invention may be configured so that the layer number information is included in address information recorded in each information storage layer.

The information storage medium of the present invention may be configured so that the layer type information is included in address information recorded in at least one of the information storage layers.

Finally, the blocks of the optical apparatus 1, the controlling section 20 in particular, may be realized by way of hardware or software as executed by a CPU as follows.

The optical apparatus 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the optical apparatus 1 a computer-readable storage medium containing control program code (executable program, intermediate code program, or source program) for the optical apparatus 1 which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disc, such as a floppy (Registered Trademark) disc or a hard disc, or an optical disc, such as compact disc—ROM/MO/MD/digital video disc/compact disc—R; a card, such as an IC card (memory card) or an optical card; or a semiconductor memory, such as a mask ROM/EPROM/EEPROM/flash ROM.

The optical disc apparatus 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power, line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a carrier wave or data signal transmission in which the program code is embodied electronically. The present invention is made realizable in form of a computer data signal embedded in a carrier wave, on electric transmission of which computer data signal the program code is embodied.

The present inventions may also be described as follows.

That is, the information recording and reproducing apparatus of the present invention may be configured so as to further include: layer number obtaining means for obtaining layer number information that is recorded in the accessed information storage layer and discriminates the accessed information storage layer from the others of the plurality of information storage layers; and layer type information obtaining means for obtaining layer type information indicating the type of the accessed information storage layer, the accessed layer determining means determining the accessed information storage layer, based on the layer number information obtained by the layer number obtaining means, and the accessed layer type identifying means identifying the type of the accessed information storage layer, based on the layer type information obtained by the layer type information obtaining means.

According to the configuration, the layer number obtaining means obtains the layer number information stored in the accessed information storage layer.

Further, according to the configuration, the accessed layer determining means determines the accessed information storage layer, based on the layer number information thus obtained by the layer number obtaining means.

Thus, by giving different pieces of layer number information to the respective information storage layers of the information storage medium, it is possible to make it easy to identify the information storage medium.

Further, according to the configuration, the layer type information obtaining means obtains the layer type information indicating the type of the accessed information storage layer.

Further, the accessed layer type identifying means identifies the type of the accessed information storage layer, based on the layer type information thus obtained by the layer type information obtaining means.

Thus, it is possible to identify the type of the accessed information storage layer.

Note that the "layer number information" herein can be any information, provided that it is possible to distinguish between the accessed information storage layer and the rest of the plurality of information storage layers of the information storage medium.

Examples of the "layer number information" encompass the binary expressed number of the information storage layers that are numbered in a sequential order in the direction from (i) that of the information storage layers which is closest to a substrate of an information storage medium to (ii) another of the information storage layers which is farthest from the substrate of the information storage medium.

The examples of the "layer number information" also encompass binary expressed number of the information storage layers that are numbered in a sequential order in the direction from (i) that of information storage layers which is closest to a side on which reproducing light enters the information storage medium to (ii) another of information storage layers which is farthest from the same side.

The information storage layers may be numbered in such an orderly ascending manner that numbers given to the respective information storage layers are sequentially greater by one or may be numbered in such a descending manner that numbers given to the respective information storage layers are sequentially smaller by one. Alternatively, the information storage layers may be numbered in a random order.

Note that examples of the "layer type information" can be (i) pieces of information indicating different types of storage properties of a rewritable information storage layer, a read-only information storage layer, the recordable information storage layer, (ii) pieces of information indicating different types of specifications such as DVD, BD, and the like, and (iii) the like information.

The information recording and reproducing apparatus of the present invention may be configured so that the layer number information is included in address information recorded in each information storage layer.

The information recording and reproducing apparatus of the present invention is thus configured. Therefore, by including the layer number information in the address information that specifies a position on the information storage medium, it is possible to obtain layer number information at any accessible point within a radius range the information storage medium in the medium plane direction.

Further, the information recording and reproducing apparatus of the present invention may be configured so that the layer type information is recorded in a management information region of at least one of the information storage layers.

Thus, by storing the layer type information in the management information region that is easily accessible, it is possible to easily obtain, at once, pieces of the layer type information of the information storage medium in the management information region.

The information recording and reproducing apparatus of the present invention may, be configured so that the management information region is a region where no tracking control is required or a region accessible by simply carrying out focus control.

According to the configuration, in a case where the pieces of layer type information are recorded in an easily accessible region (management information region) such as an accessible region where no tracking control is required or an accessible region accessible by simply carrying out focus control, it is possible to easily obtain the pieces of the layer type information of the optical disc in the management information region at once without necessity of reproducing piece of information from the respective information storage layers.

The information recording and reproducing apparatus of the present invention can be configured so that the layer type information is included in address information recorded in each information storage layer.

According to the configuration, the layer type information can be directly obtained in the accessed information storage layer. Thus, even in a case of not reproducing the layer type information recorded in the management information region and directly accessing an information storage layer, it is possible to identify a type of the information storage layer.

Note that, in a case where the layer type information is recorded in the management information region, for example; a storage area associated with the information storage layer should be provided and layer type information of the information storage layer should be recorded in the storage area.

Regarding information storage mediums of two or more different types, even in a case where they are information storage mediums of an old specification and a new specification, it is preferable to prepare their information storage layers of same storage properties by use of same stampers. In other words, in a case, where information storage mediums of different specifications have respective information storage layers of same storage properties, it is possible to cause a reduction in entire cost by preparing these information storage layers by use of same stampers.

For example, for manufacturing of a two-layered combination disc having a ROM layer and an RE layer, a ROM layer stamper and an RE layer stamper are required. However, if this two-layered combination disc can be manufactured by using a ROM layer stamper and an RE layer stamper which are respectively for use in manufacturing of a disc having only a ROM layer(s) and a disc having only an RE layer(s), then it is possible to cause a cost reduction.

However, in such an event, all pieces of layer number information are "0", which is usually layer number information indicating that a single layer is provided in a disc. This gives rise to a problem that no information recording and reproducing apparatus can determine, by merely reproducing address information, which information storage layer is put in focus.

In view, for example, it is optional to manufacture the two-layered combination disc with the use of the ROM layer stamper and the RE layer stamper in a modified manner so that a layer number of either one of the ROM layer and the RE layer is "1". However, this gives rise to a problem that, for example, it is impossible to determine whether the RE layer of the two-layered combination disc is an RE layer of a two-layered combination disc having the RE layer and another RE layer or an RE layer of a two-layered combination disc having the RE layer and a ROM layer.

In order to solve such a problem, the information recording and reproducing apparatus of the present invention may be configured so that: the address information is recorded in an address information storage region of each information storage layer; each type of information storage layers stores the layer number information at a different storage location in the address information storage region thereof; and the layer number obtaining means obtains the layer number information at the storage location corresponding to the type of the accessed information storage layer.

Further, the information recording and reproducing apparatus of the present invention may include layer type information obtaining means for obtaining layer type information indicating the type of the accessed information storage layer, wherein the layer number obtaining means, obtains the layer number information from the storage location by referring to the layer type information thus obtained by the layer type information obtaining means.

The information storage medium of the present invention may be further configured so that each type of information storage layers stores the layer number information at a different storage location in the address information storage region thereof.

According to the configuration, the storage location where the layer number information is recorded in the address information storage region is thus different depending on the type of the information storage layer. It is therefore possible, for example, to discriminate information storage layers having same layer number information in information storage mediums complying with different specifications.

That is, for example, it is possible to distinguish between RE layers of a two-layer combination disc having two RE layers and an RE layer of a two-layer combination disc having a ROM layer and the RE layer.

Further, the information recording and reproducing apparatus of the present invention may include: reproduction condition setting means for setting a reproduction condition, based on the type, identified by the accessed layer type identifying means, of the accessed information storage layer the reproduction condition being a condition in which information recorded in that information storage layer is reproduced, the information recording and reproducing apparatus reproducing, in the reproduction condition being set by the reproduction condition setting means, the information recorded in the accessed information storage layer.

According to the configuration, the reproduction condition setting means thus sets up, based on the type of the information storage layer thus identified by the accessed layer type identifying means, the reproduction condition in which the information recorded in the information storage layer is reproduced. In the reproduction condition thus set up, the information recorded in the information storage layer having been accessed is reproduced in the information recording and reproducing apparatus of the present invention.

Therefore, even in a case of accessing a information storage layer different from a target information storage layer due to false operation by the information recording and reproducing apparatus or the like, it is still possible to set, a reproduction condition matching, a reproduction condition suitable for reproduction of information recorded in the information storage layer having been accessed.

Examples of the "reproduction condition" can be setting for reproduction control (such as setting of focus control, tracking control, reproduction power, and the like).

Further, the information recording and reproducing apparatus of the, present invention may include recording condition setting means for setting a recording condition, based on the type, identified by the accessed layer type identifying means, of the accessed information storage layer, the recording condition being a condition in which information recorded in that information storage layer, the information recording and reproducing apparatus recording, in the recording condition being set by the recording condition setting means, the information in the accessed information storage layer.

According to the configuration, the recording condition setting means thus sets, based on the type of the information storage layer thus identified by the accessed layer type identifying means, the recording condition in which the information is recorded in the information storage layer. The information recording and reproducing apparatus records the information in the accessed information storage layer in conformity with the recording condition thus set.

Therefore, even in a case of accessing an information storage layer different from a target information storage layer due to false operation by the information recording and reproducing apparatus or the like, it is still possible to set a recording condition matching a recording condition suitable for information recording in the information storage layer having been accessed.

Examples of the "recording condition" can be setting for recording control (such as setting of focus control, tracking control, recording power, and the like).

Further, the information storage medium of the present invention may be configured so that the layer number information is included in address information recorded in each information storage layer.

The information storage medium of the present invention is thus configured. Therefore, by including the layer number information in the address information that specifies a position on the information storage medium, the information storage medium can be provided in which information storage medium it is possible to obtain a layer number at ay accessible point within a radius range of the information storage medium in the medium plane direction.

The information storage medium of the present invention may be configured so that the layer type information is included in address information recorded in the one or more of the information storage layers.

With the configuration, by including the layer type information in the address information that specifies a location on the information storage medium, it is possible to obtain the layer type information at any accessible point within a radius range of the information storage medium in a medium plane direction.

Each means, function, processing, and step of the information recording and reproducing apparatus and the method for controlling this apparatus may be realized on a computer. In such a case, the scope of the present invention encompasses an information reproduction program for realizing the information recording and reproducing program and the method for controlling the same on a computer by causing the computer to operate as each means and function or each step. Further, the scope of the present invention also encompasses a computer-readable storage medium in which the information reproduction program is stored.

The layer type information can be thus directly obtained in the accessed information storage layer having. Therefore, the information recording and reproducing apparatus can be provided in which, even in a case of not reproducing the layer type information recorded in the management information region and directly accessing an information storage layer, it is still possible to identify a type of the accessed information storage layer having.

The present invention is not limited to the description of the embodiments above, but may be altered by a skilled person within the scope of the claims. An embodiment based on a proper combination of technical means as disclosed in different embodiments is encompassed in the technical scope of the present invention.

Industrial Applicability

The present invention is widely applicable to (i) an optical information storage medium having a multi-layered structure including ROM, RE, and R layers, (ii) an optical information recording and reproducing apparatus that records information and/or information recorded in/from the optical information storage medium, and (iii) the like.

Reference Signs List
1. optical disc apparatus (information recording and reproducing apparatus)
3. storage section
6. disc loading detecting section
7. operation section
10. recording/reproduction circuit group
11. optical head
12. optical pickup
13. pickup driving circuit
14. laser driving circuit
15. reproduction circuit
20. controlling section
21. disc management section
22. reproduction controlling section
23. recording controlling section (recording condition setting means)
24. recording/reproduction circuit group controlling section
31. storage layer—storage area association table storage section
32. layer number—storage layer association table storage section
33. layer type identification result storage section
34. recording/reproduction control scheme setting information (recording condition/reproduction condition) storage section
100. optical disc (information storage medium)
101. management information region
102. user storage region
103. BCA
104. PIC
105. layer type information storage region
106. sector
107. address information storage region
221. layer type information obtaining section (layer type information obtaining means)
222. layer number obtaining section (layer number obtaining means, accessed layer determining means)
223. layer type identifying section (accessed layer type identifying means)
224. reproduction control scheme setting section (reproduction condition setting means)
225. reproduced data holding section
A1 through A8. storage area
B1. layer number (layer number information) storage region
B2. sector number storage region
C1. layer type (layer type information) storage region
C2. layer number (layer number information) storage region
C3. sector number storage region
D1. layer number (layer number information) storage region
D2. sector number storage region
L0 through L7. information storage layer
R. reproducing light
S. light spot position

The invention claimed is:

1. An information recording and reproducing apparatus that records and reproduces information in/from an information storage medium having a plurality of information storage layers of two or more different types, the information recording and reproducing apparatus comprising:
accessed layer determining means for determining an accessed information storage layer, which is an information storage layer that is accessed among the plurality of information storage layers;
accessed layer type identifying means for identifying a type of the accessed information storage layer thus determined by the accessed layer determining means;
layer number obtaining means for obtaining layer number information that is recorded in the accessed information storage layer and discriminates the accessed information storage layer from the rest of the plurality of information storage layers; and
layer type information obtaining means for obtaining layer type information indicating the type of the accessed information storage layer,
wherein the accessed layer determining means determines the accessed information storage layer, based on the layer number information obtained by the layer number obtaining means,
the accessed layer type identifying means identifies the type of the accessed information storage layer, based on the layer type information obtained by the layer type information obtaining means;
the number information is included in address information recorded in each information storage layer; and
wherein:
the address information is recorded in an address information storage region of each information storage layer;
each type of information storage layer stores the layer number information at a different storage location in the address information storage region thereof; and
the layer number obtaining means obtains the layer number information at the storage location corresponding to the type of the accessed information storage layer.

2. The information recording and reproducing apparatus as set forth in claim 1, wherein the layer type information is recorded in a management information region of at least one of the information storage layers.

3. The information recording and reproducing apparatus as set forth in claim 2, wherein the management information region is a region where no tracking control is required.

4. The information recording and reproducing apparatus as set forth in claim 2, wherein the management information is a region accessible by simply carrying out focus control.

5. The information recording and reproducing apparatus as set forth in claim 1, wherein the layer type information is included in address information recorded in each information storage layer.

6. The information recording and reproducing apparatus as set forth in claim 1, comprising:
layer type information obtaining means for obtaining the layer type information indicating the type of the accessed information storage layer, wherein
the layer number obtaining means obtains the layer number information at the storage location by referring to the layer type information thus obtained by the layer type information obtaining means.

7. The information recording and reproducing apparatus as set forth in claim 1, further comprising:
reproduction condition setting means for setting a reproduction condition, based on the type, identified by the accessed layer type identifying means, of the accessed information storage layer, the reproduction condition being a condition in which information recorded in the accessed information storage layer is reproduced,
the information recording and reproducing apparatus reproducing, in the reproduction condition being set by the reproduction condition setting means, the information recorded in the accessed information storage layer.

8. The information recording and reproducing apparatus as set forth in claim 1, further comprising:
recording condition setting means for setting a recording condition, based on the type, identified by the accessed layer type identifying means, of the accessing information storage layer, the recording condition being a condition in which information recorded in the accessed information storage layer is reproduced,
the information recording and reproducing apparatus recording, in the recording condition being set by the recording condition setting means, the information in the accessed information storage layer.

9. A non-transitory computer-readable storage medium in which an information reproducing program for causing a computer to operate as a means of the information recording and reproducing apparatus as set forth in claim 1 is stored.

10. A method for controlling an information recording and reproducing apparatus that records and reproduces information in/from an information storage medium having a plurality of information storage layers of two or more different types, the method comprising the steps of:
a determining step for determining an accessed information storage layer, which is an information storage layer that is accessed among the plurality of information storage layers;
an identifying step for identifying a type of the accessed information storage layer determined in the step of determining the accessed information storage layer;
a first obtaining step for obtaining layer number information that is recorded in the accessed information storage layer and discriminating the accessed information storage layer from the rest of the plurality of information storage layers; and
a second obtaining step for obtaining layer type information indicating the type of the accessed information storage layer,
wherein said determining step includes determining the accessed information storage layer, based on the layer number information obtained in said first obtaining step;
said identifying step identifies the type of the accessed information storage layer, based on the layer type information obtained in said second obtaining step;
the number information is included in address information recorded in each information storage layer; and
wherein:
the address information is recorded in an address information storage region of each information storage layer;
each type of information storage layer stores the layer number information at a different storage location in the address information storage region thereof; and
the first obtaining step obtains the layer number information at the storage location corresponding to the type of the accessed information storage layer.

11. An information storage medium having a plurality of information storage layers of two or more different types, wherein each information storage layer stores therein layer number information discriminating the information storage layer from the rest of the plurality of information storage layers, and at least one of the information storage layers stores, in a management information region thereof, layer type information indicating types of the respective plurality of information storage layers:
wherein the layer number information is included in address information recorded in each information storage layer; and
wherein each type of information storage layer stores the layer number information at a different location in an address information storage region thereof in which the address information is stored.

12. The information storage medium as set forth in claim 11, wherein the layer type information is included in address information recorded in at least one of the information storage layers.

* * * * *